United States Patent [19]

Milton et al.

[11] 3,747,427

[45] July 24, 1973

[54] MOUNTING ARRANGEMENT FOR COLLAPSIBLE STEERING COLUMN

[75] Inventors: Thomas J. Milton, Bay City; John W. Skelly, Saginaw, both of Mich.

[73] Assignee: General Motors Corporation, Detroit, Mich.

[22] Filed: May 15, 1972

[21] Appl. No.: 253,401

[52] U.S. Cl. ............................................. 74/492
[51] Int. Cl. ............................................. B62d 1/18
[58] Field of Search ............................. 74/492, 493

[56] References Cited
UNITED STATES PATENTS

| | | | |
|---|---|---|---|
| 3,476,345 | 11/1969 | Ristau | 74/492 X |
| 3,707,096 | 12/1972 | Bennett | 74/492 |

Primary Examiner—Milton Kaufman
Attorney—Warren E. Finken, Saul Schwartz et al.

[57] ABSTRACT

A mounting arrangement for a collapsible steering column assembly having a lower portion adapted for rigid anchorage on a vehicle body and an upper portion adapted for axial collapse relative to the lower portion, the mounting arrangement including a bracket on the upper column portion having an open ended slot therein, a plurality of land surfaces on the bracket adjacent each longitudinally extending edge of the slot imparting to the edges progressively increasing thickness from the open end of the slot, a capsule adapted for rigid connection to the vehicle body and for sliding reception in the slot, and a plurality of integral resilient fingers struck from the body of the capsule and adapted to grippingly engage respective ones of the land surfaces on the bracket, the fingers generally simultaneously releasing the land surfaces upon initial collapse of the upper column portion.

5 Claims, 7 Drawing Figures

PATENTED JUL 24 1973　　　　　　　　　　　3,747,427
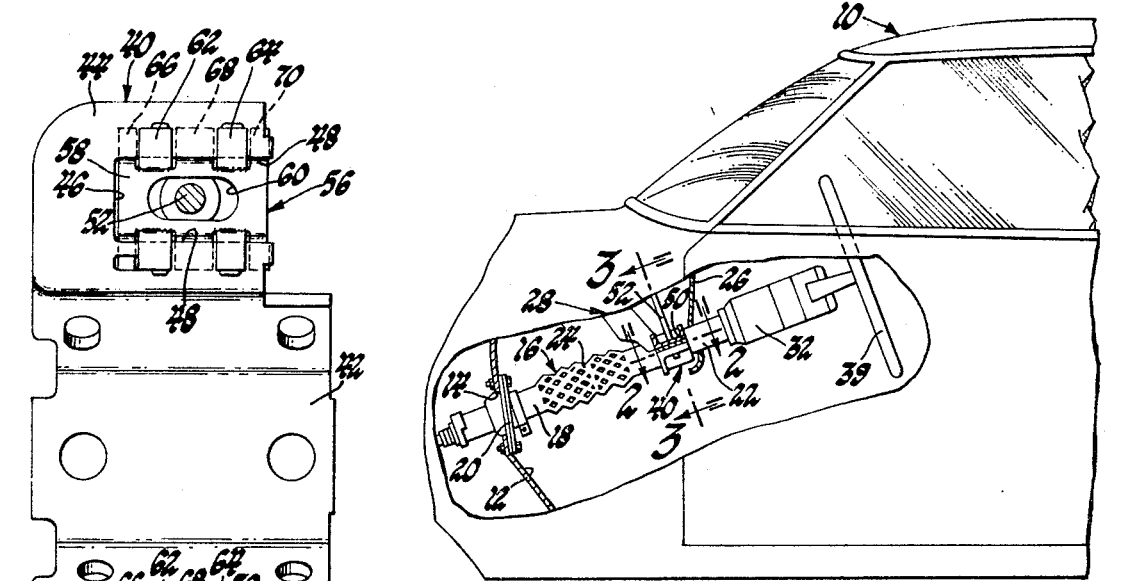
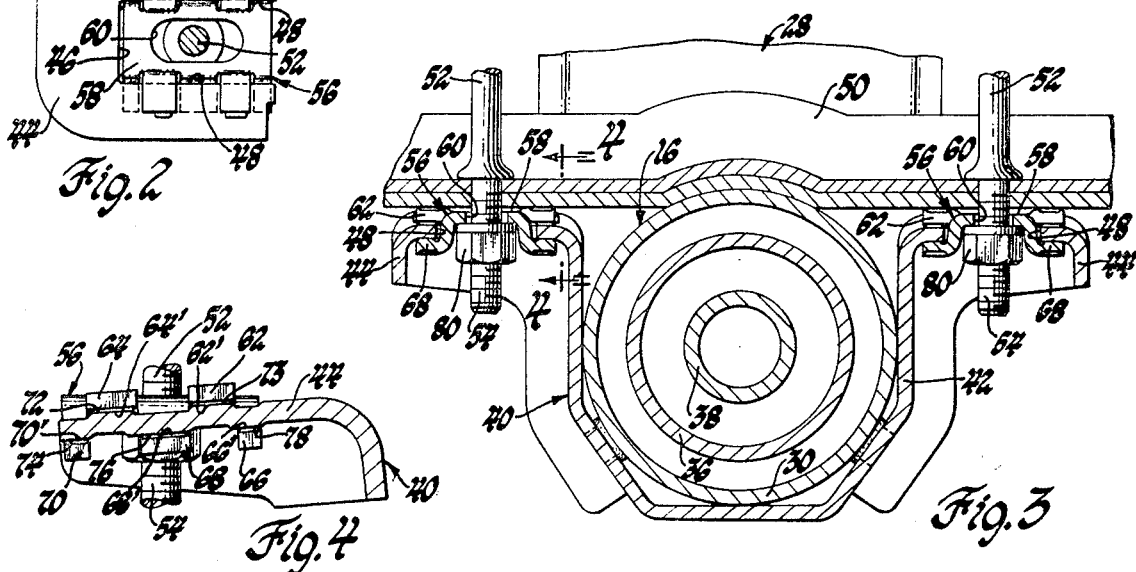
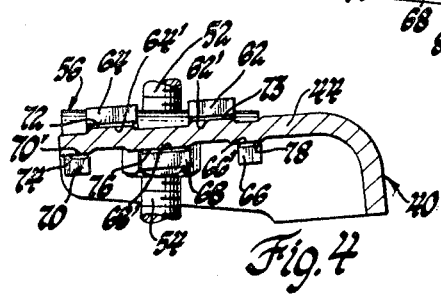
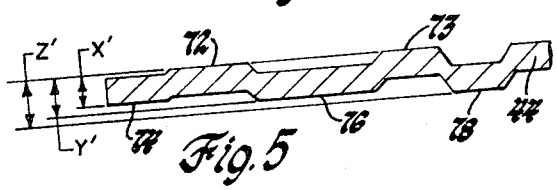
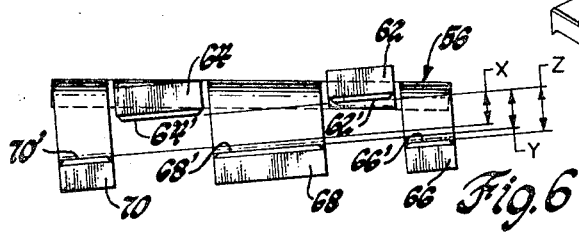
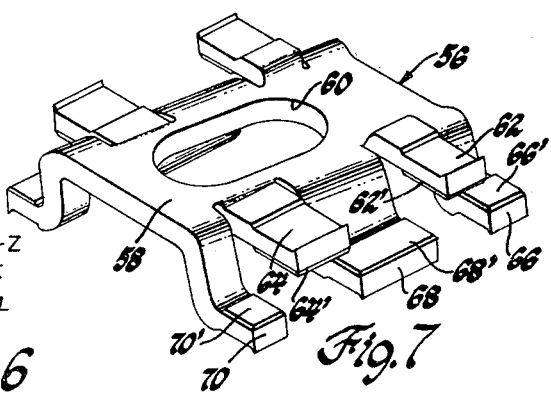

3,747,427

MOUNTING ARRANGEMENT FOR COLLAPSIBLE STEERING COLUMN

This invention relates generally to collapsible steering column assemblies for automobile type vehicles and more particularly to a mounting arrangement for such column assemblies.

Collapsible steering column assemblies are currently widely used in the automotive industry and typically include a first or lower portion anchored to the vehicle body and a second or upper portion connected to the lower portion and adapted for axial collapse relative to the latter in an energy absorbing mode. Typically the second column portion has a bracket thereon which is releasably attached to the vehicle body through mounting capsules which are bolted to the body and connected to the bracket through frangible connections such as plastic pins injection molded into both the bracket and the capsule. Consequently, whenever there is relative movement between the upper column portion and the vehicle body the frangible connection is destroyed and an entire new bracket must be installed. A mounting arrangement according to this invention incorporates reusable mounting capsules which obviate replacement of the entire bracket and which also facilitate rapid and substantially unimpeded separation of the bracket upon initiation of collapse of the column assembly.

The primary feature, then, of this invention is that it provides a new and improved mounting arrangement for a collapsible steering column assembly in an automobile type vehicle. Another feature of this invention is that it provides a new and improved mounting arrangement wherein reusable connecting means, disposed between a portion of the column assembly and the vehicle body, resiliently grip the column assembly and are calibrated to effect release thereof under predetermined axial loading on the column assembly. Still another feature of this invention resides in the provision in the mounting arrangement of a bracket on the collapsible portion of the column assembly having thereon a plurality of land portions defining a generally tapering configuration, the land portions being adapted to be gripped by resilient finger means rigidly attached to the vehicle body and the tapering configuration assuring that upon substantially simultaneous separation of the land portions from the finger means the latter will not engage any of the other land portions so that collapse of the column assembly is substantially unimpeded. A still further feature of this invention resides in the provision of reusable connecting means in the form of a capsule including a flat body section adapted for rigid attachment to the vehicle body and a plurality of integral resilient fingers struck from a pair of opposite side edges of the body section, the fingers being vertically spaced to form generally longitudinally tapering channels adapted to slidably and releasably receive corresponding land portions adjacent the side edges of a slot on the steering column assembly. These and other features of this invention will be readily apparent from the following specification and from the drawings wherein:

FIG. 1 is a fragmentary partially broken away side elevational view of an automobile type vehicle body having a collapsible steering column assembly supported thereon through a mounting arrangement according to this invention;

FIG. 2 is an enlarged sectional view taken generally along the plane indicated by lines 2—2 in FIG. 1;

FIG. 3 is an enlarged sectional view taken generally along the plane indicated by lines 3—3 in FIG. 1;

FIG. 4 is an enlarged sectional view taken generally along the plane indicated by lines 4—4 in FIG. 3;

FIG. 5 is an enlarged view of a portion of FIG. 4 but showing only a portion of the steering column mounting bracket;

FIG. 6 is an enlarged side elevational view of the mounting capsule portion of a mounting arrangement according to this invention; and FIG. 7 is an enlarged perspective view of the mounting capsule.

Referring now to FIG. 1 of the drawings, there shown is a fragmentary partially broken away view of the forward portion of an automobile vehicle body designated generally 10 including interiorly thereof a rigid fire wall 12 separating the engine compartment of the vehicle from the passenger compartment. The fire wall 12 includes an aperture 14 through which projects the lower portion of a collapsible steering column assembly 16. The steering column assembly 16 is generally conventional and includes a lower portion 18 adapted for rigid anchorage on the fire wall 12 through a plate assembly 20 bolted to the fire wall. The steering column assembly further includes an upper portion 22 connected to the lower column portion 18 through a corrugated metal section 24. The corrugated section 24 normally maintains the upper column portion 22 in rigid relation to the lower column portion 18. In the event of a substantial axially directed impact on the upper column portion the corrugated section 24 is adapted for plastic deformation which effects energy absorption and permits axial collapse of the upper column portion 22 relative to the lower column portion 18. Rearwardly of the fire wall 12 there is disposed transversely across the passenger compartment an instrument panel structure designated generally 26 and forward of the instrument panel structure there is disposed a rigid bracket assembly 28 adapted as described hereinafter for cooperation with a mounting arrangement according to this invention in releasably supporting the upper column portion 22 on the vehicle body.

As seen best in FIG. 3, the upper column portion 22 includes a cylindrical mast jacket 30 connected at its lower end to the corrugated section 24 and at its upper end to a hub 32. A cylindrical shift tube 36 is rotatably disposed within the mast jacket 30 for manual manipulation in a conventional manner by a shift lever and shift bowl assembly, not shown, rotatably disposed on the hub 32. A steering shaft 38 is rotatably disposed within the shift tube 36 and is connected at its upper end to a steering wheel 39 disposed outboard of the hub 32 and at its lower end forward of the fire wall 12 to the vehicle steering gear, not shown.

Referring now to FIGS. 1, 2 and 3, the mast jacket 30 has rigidly attached thereto an instrument panel bracket 40 adapted as described hereinafter for releasable connection to the bracket assembly 28 on the vehicle body. The instrument panel bracket 40 is generally U-shaped in configuration and includes a main body portion 42 embracing and rigidly attached to the mast jacket 30 and a pair of laterally spaced outwardly extending wing flanges 44. Each wing flange has formed therein a generally rectangular slot 46 opening rearwardly with respect to the direction of axial collapse of the upper column portion 22. Each slot includes a pair of parallel side edges 48 extending generally axially of the steering column assembly. The instrument panel bracket 40 is located axially along the mast jacket 30 such that in an uncollapsed condition of the steering column assembly, FIGS. 1 and 2, the instrument panel bracket is disposed in juxtaposition with a flange portion 50 of the bracket assembly 28.

The bracket assembly 28 further includes a pair of laterally spaced and generally vertically oriented rods 52 which are rigidly attached to the vehicle body forward of the instrument panel structure 26 and which project downwardly through appropriate apertures in the flange portion 50 of the bracket assembly, each of the rods having a threaded portion 54 extending beyond the lower surface of the flange portion 50, FIG. 3. The slots 46 in the wing flanges 44 on the instrument panel bracket are adapted for registry with the threaded portions 54 of the rods so that in the uncollapsed condition of the steering column assembly the rods are disposed generally centrally in the slots, FIGS. 2 and 3.

Those skilled in the art will recognize, of course, that axial collapse of the upper column portion 22 effects forward movement, FIG. 1, of the instrument panel bracket 40 relative to the flange portion 50 on the bracket assembly 28. Accordingly, provision is made for releasably connecting the instrument panel bracket to the bracket assembly 28. More particularly, and with reference to FIGS. 2, 3, and 7, the slots 46 have disposed therein respective ones of a pair of identical mounting capsules 56 preferably fabricated as metal stampings. Describing only one of the capsules, the latter includes a generally flat body section 58 having an aperture 60 therein, a pair of integral upper resilient fingers 62 and 64, and a trio of integral lower resilient fingers 66, 68 and 70 struck from one side thereof. It will be understood, of course, that a similar plurality of resilient fingers are struck from the opposite side of the body section and function in the same manner as the fingers recited hereinbefore. Each of the resilient fingers 62, 64, 66, 68 and 70 includes a bearing surface 62', 64', 66', 68' and 70', the surfaces 62' and 64' opposing the surfaces 66', 68' and 70' to define generally a channel extending along the side of the body section.

As seen best in FIG. 6, when the upper and lower fingers on the mounting capsule are unstressed each assumes a predetermined position relative to the others. More particularly, in the unstressed condition the bearing surfaces 62' and 64' are aligned in a common plane. The bearing surfaces 66', 68' and 70', however, are aligned in three separate planes spaced progressively further apart from the plane of the bearing surfaces 62' and 64'. In particular, the bearing surface 70' is spaced from the plane of the bearing surfaces 62' and 64' by a distance designated X in FIG. 6. Similarly, the bearing surfaces 68' and 66' are spaced from the plane of bearing surfaces 62' and 64', respectively, by distances Y and Z, FIG. 6. The distance Z exceeds the distance Y and the distance Y, in turn, exceeds the distance X so that the upper and lower fingers along the side of the body section 58 define a longitudinally extending channel having resilient side walls which exhibit a longitudinal taper with respect to the vertical height of the channel.

Referring particularly now to FIGS. 4 and 5, each wing flange 44 on the instrument panel bracket 40 has formed thereon adjacent the side edges 48 of the slots 46 a plurality of land surfaces corresponding to the upper and the lower fingers on the mounting capsules 56. More particularly, and describing only one side edge since the land surfaces adjacent each are identical, on the upper surface of the wing flange adjacent the edge 48 of the slot 46 there is formed a pair of upper land surfaces 72 and 73 disposed in a common plane. On the lower surface of the wing flange 44 adjacent the edge 48 of the slot 46 there is formed a trio of land surfaces 74, 76 and 78 disposed in separate planes at varying distances from the plane of land surfaces 72 and 73. As seen best in FIG. 5, the land surface 74 is spaced from the plane of the land surfaces 72 and 73 by a distance X' while the land surfaces 76 and 78 are spaced from the plane of land surfaces 72 and 73 by, respectively, the distances Y' and Z'. The distance Z' exceeds the distance Y' and the distance Y', in turn, exceeds the distance X'. Accordingly, the upper and lower land surfaces along the edge 48 of the slot 46 impart a thickness configuration to the edge tapering longitudinally from a thinnest portion adjacent the open end of the slot to a thickest portion adjacent the closed end of the slot.

As seen best in FIGS. 2, 3 and 4, the tapering channel formed by the upper and lower fingers on the mounting capsule slidably receives the side edge 48 of the slot 46 with the bearing surfaces 62' and 64' on the upper fingers engaging the land surfaces 73 and 72, respectively, and the bearing surfaces 66', 68' and 70' engaging, respectively, the land surfaces 78, 76 and 74. The distance Z' corresponds generally to the distance Z but is slightly larger than the latter so that as the mounting capsule is inserted into the slot 46 the lower finger 66 and the upper finger 62 are resiliently flexed, the forces generated thereby causing friction between the land surfaces and the bearing surfaces which friction effects retention of the capsule in the slot in the wing flange. Similarly, the distances Y' and x' correspond to but slightly exceed, respectively, the distances Y and X so that both the lower fingers 68 and 70 also experience slight resilient flexure thereby to generate further friction between the bearing surfaces and land surfaces for retention of the capsule. The force required to slide the mounting capsule out of the slot 46 is a direct function of the resilience or the amount of flexure of the upper and lower fingers on the mounting capsule. Accordingly, the force required for such seaparation may be quite accurately predicted or varied depending upon the distances X, Y and Z or the distances X', Y' and Z'.

With the mounting capsules 56 inserted in the slots 46 in the instrument panel bracket 40 as described hereinbefore, the apertures 60 in the mounting capsules register with and receive therethrough the threaded portions 54 of the rods 52, FIG. 3. Each mounting capsule is then rigidly and permanently connected to the bracket assembly 28 by respective ones of a pair of nuts 80 received on the threaded portions 54 of the rods 52. Accordingly, the upper column portion 22 is thereby rigidly but releasably attached to the bracket assembly 28.

Describing now a typical steering column collapse sequence, the critical dimensions of the corrugated metal section 24 of the steering column assembly ensure that the axial force necessary to initiate collapse of the upper column portion 22 exceeds the force required to slide the mounting capsules 56 out of the slots 46 in the instrument panel bracket. Accordingly, when an axial force of magnitude sufficient to initiate collapse of the upper column portion 22 is exerted on the steering column assembly, the upper column portion moves leftwardly, FIG. 1, toward the lower column portion 18. Simultaneously, the instrument panel bracket 40 moves leftwardly, FIG. 2, with respect to the mounting capsules 56 since the latter are rigidly attached to the bracket assembly 28 through the rods 52 and the nuts 80. After slight relative movement between the instrument panel bracket and the mounting capsules, the upper fingers 62 and 64 and the lower fingers 66, 68 and 70 generally simultaneously slide off of the land surfaces 73, 72, 78, 76 and 74, respectively. Thus, after only slight relative movement between the instrument panel bracket and the mounting capsules, the frictional forces originally retaining the latter in the former cease so that collapse of the upper column portion is not frictionally retarded.

Referring to FIGS. 5 and 6, the distance Z' exceeds the distance Z in order to effect flexure of the upper and lower fingers 62 and 66. The distance Z, however, exceeds the distance Y' to ensure that as the capsule separates from the instrument panel bracket through the open end of slot 46, the finger 66 will pass easily over the land surface 76 without generating any significant retarding friction. Similarly, the distance Y exceeds the distance X' to ensure that the finger 68 will pass easily over the land surface 74 without generating any significant retarding friction. Thus, after the initial friction retention forces cease, no further retarding friction is developed between the mounting capsules and the instrument panel bracket.

Having thus described the invention, what is claimed is:

1. In a mounting arrangement for a collapsible steering column assembly a first portion of which is fixed on a vehicle body and a second portion of which is adapted for axial collapse relative to said first portion, the combination comprising, bracket means rigidly attached to said second portion and defining an edge portion extending generally longitudinally of said steering column assembly, means on said bracket means generally adjacent said edge portion defining a plurality of land surfaces imparting to said edge portion progressively increasing thickness in the direction of collapse of said steering column assembly, a rigid anchor means on said vehicle body, and resilient finger means on said anchor means grippingly engaging respective ones of said land surfaces in an uncollapsed condition of said steering column assembly thereby to support said second portion on said vehicle body and further adapted to separate generally simultaneously from each of said land surfaces under predetermined axial loading on said second portion without thereafter grippingly engaging any other of said land surfaces thereby to permit substantially unimpeded separation between said bracket means and said anchor means during collapse of said steering column assembly.

2. In a mounting arrangement for a collapsible steering column assembly a first portion of which is fixed on a vehicle body and a second portion of which is adapted for axial collapse relative to said first portion, the combination comprising, bracket means rigidly attached to said second portion and having therein a slot opening rearwardly with respect to the direction of collapse of said steering column assembly and defining a pair of laterally spaced side edges extending generally longitudinally of said steering column assembly, means on said bracket means generally adjacent each of said side edges defining a plurality of axially spaced land surfaces, said land surfaces imparting to each of said edges progressively increasing thickness from the open end of said slot to the closed end thereof, a rigid anchor means on said vehicle body reclined in said slot in an uncollapsed condition of said steering column assembly, and resilient finger means on said anchor means grippingly engaging respective ones of said land surfaces in the uncollapsed condition of said steering column assembly thereby to support said second portion on said vehicle body and to retain said anchor means in said slot and further adapted to separate generally simultaneously from each of said land surfaces under predetermined axial loading on said second portion without thereafter grippingly engaging any other of said land surfaces thereby to permit substantially unimpeded separation between said bracket means and said anchor means during collapse of said steering column assembly.

3. In a mounting arrangement for a collapsible steering column assembly a first portion of which is fixed on a vehicle body and a second portion of which is adapted for axial collapse relative to said first portion, the combination comprising, bracket means rigidly attached to said second portion and having therein a slot opening rearward with respect to the direction of collapse of said steering column assembly and defining a pair of laterally spaced side edges extending generally longitudinally of said steering column assembly, means on said bracket means generally adjacent each of said side edges defining a plurality of axially spaced land surfaces, said land surfaces imparting to each of said edges progressively increasing thickness from the open end of said slot to the closed end thereof, a mounting capsule adapted for insertion in said slot through the open end of the latter, means rigidly affixing said mounting capsule to said vehicle body in a manner whereby said capsule is disposed in said slot in an uncollapsed condition of said steering column assembly, and means on said capsule defining a plurality of integral resilient fingers grippingly engaging respective ones of said land surfaces in the uncollapsed condition of said steering column assembly thereby to support said second portion on said vehicle body and to retain said capsule in said slot and further adapted to separate generally simultaneously from each of said land surfaces under predetermined axial loading on said second portion without thereafter grippingly engaging any other of said land surfaces thereby to permit substantially unimpeded separation between said bracket means and said capsule during collapse of said steering column assembly.

4. In a collapsible steering column assembly mounting arrangement including a steering column assembly having a first portion adapted for fixed anchorage on a vehicle body and a second portion adapted for axial collapse relative to said first portion and further including rigid bracket means on said second portion, a mounting capsule adapted to releasably connect said bracket means and a rigid portion of said vehicle body comprising, a body portion having means therein adapted to facilitate rigid attachment of said body portion to said vehicle body, and a plurality of resilient finger portions for gripping said bracket means integral with said body portion and extending transversely of the latter in vertically spaced relation to define a pair of channels extending in parallel relation along a pair of opposite edges of said body portion, said resilient finger portions in a relaxed condition thereof being spaced vertically progressively further apart from one end of said body portion to the other thereby to impart to each of said channels generally a longitudinal tapering configuration.

5. In a collapsible steering column assembly mounting arrangement including a steering column assembly having a first portion adapted for fixed anchorage on a vehicle body and a second portion adapted for axial collapse relative to said first portion and further including rigid bracket means on said second portion, a mounting capsule adapted to releasably connect said bracket means and a rigid portion of said vehicle body comprising, a generally flat body portion having means thereon adapted to facilitate rigid attachment of said body portion to said vehicle body, and a plurality of integral resilient finger portions for gripping said bracket means struck from said body portion along a pair of opposite edges of the latter, alternate ones of said finger portions along each of said edges being disposed in vertically spaced relation thereby to define a pair of channels extending in parallel relation along said edges, the vertical spacing between said finger portions progressively increasing from one end of said body portion to the other thereby to impart to each of said channels generally a longitudinal tapering configuration.

* * * * *